United States Patent
Johnson et al.

(10) Patent No.: US 7,423,785 B1
(45) Date of Patent: Sep. 9, 2008

(54) JOB RECOVERY FOR SCAN TO EMAIL

(75) Inventors: Stephen K. Johnson, Meridian, ID (US); Kristin S. Dahl, Meridian, ID (US); Theresa L. McGuire, Meridian, ID (US); Clint S. Cuzzo, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/430,354

(22) Filed: Oct. 28, 1999

(51) Int. Cl.
H04N 1/04 (2006.01)

(52) U.S. Cl. ............... 358/474; 358/1.15; 358/402; 358/442; 379/100.17; 379/93.32

(58) Field of Classification Search ............... 358/1.14, 358/1.15, 402, 407, 434, 437, 440, 474, 403, 358/405, 442; 379/93.24, 100.01, 100.14, 379/88.13, 100.08; 307/206, 207, 238; 709/232, 709/230

See application file for complete search history.

(56) References Cited

U.S. PATENT DOCUMENTS

| | | | | |
|---|---|---|---|---|
| 4,713,780 A | * | 12/1987 | Schultz et al. | 358/1.18 |
| 4,975,783 A | * | 12/1990 | Takaoka | 358/404 |
| 5,103,318 A | * | 4/1992 | Takaoka | 358/404 |
| 5,258,853 A | * | 11/1993 | Nobuta et al. | 358/403 |
| 5,583,715 A | * | 12/1996 | Miura | 360/99.01 |
| 5,613,135 A | * | 3/1997 | Sakai et al. | 710/62 |
| 5,617,221 A | * | 4/1997 | DeVries et al. | 358/442 |
| 5,737,514 A | * | 4/1998 | Stiffler | 714/13 |
| 5,764,918 A | * | 6/1998 | Poulter | 709/236 |
| 5,826,034 A | * | 10/1998 | Albal | 709/239 |
| 5,832,331 A | * | 11/1998 | Yoshida et al. | 399/43 |
| 5,838,685 A | * | 11/1998 | Hochman | 340/825.52 |
| 6,018,802 A | * | 1/2000 | Abe et al. | 713/300 |
| 6,044,405 A | * | 3/2000 | Driscoll et al. | 709/232 |
| 6,061,148 A | * | 5/2000 | Ishikawa | 358/437 |
| 6,072,795 A | * | 6/2000 | Poulter | 370/352 |
| 6,088,125 A | * | 7/2000 | Okada et al. | 358/402 |
| 6,094,277 A | * | 7/2000 | Toyoda | 358/1.15 |
| 6,229,884 B1 | * | 5/2001 | Toyoda et al. | 379/100.08 |
| 6,469,798 B1 | * | 10/2002 | Toyoda et al. | 358/1.15 |
| 6,526,447 B1 | * | 2/2003 | Giammaria | 709/232 |
| 6,545,774 B1 | * | 4/2003 | Park | 358/441 |
| 6,646,981 B1 | * | 11/2003 | Kinouchi et al. | 370/216 |
| 6,685,562 B1 | * | 2/2004 | Rantanen | 463/17 |
| 6,792,085 B1 | * | 9/2004 | Rigaldies et al. | 379/88.13 |
| 6,879,411 B1 | * | 4/2005 | Otsuka et al. | 358/1.15 |

FOREIGN PATENT DOCUMENTS

JP 11068992 A * 3/1999

* cited by examiner

*Primary Examiner*—Edward L. Coles, Sr.
*Assistant Examiner*—Negussie Worku

(57) ABSTRACT

A document is scanned in a scanning device to obtain electronic data. The electronic data represents information on the document. The electronic data is stored to a storage device. An error then occurs either before or after beginning transmission of the data to an e-mail server. The error causes a failure in the communication of the data to the e-mail server. The method of failure detection depends on the type of failure. For a loss of power, the data storage device is examined for the electronic data. If electronic data is found, communication is established with the e-mail server and the electronic data is transmitted to the e-mail server. The data storage device must be a non-volatile data storage device to recover from a loss of power error. For a loss of communication with the server or failure to establish communication with the server, communication is established with the e-mail server and the electronic data is transmitted to the e-mail server.

6 Claims, 2 Drawing Sheets

JOB RECOVERY FOR SCAN TO EMAIL

FIELD OF THE INVENTION

This invention relates in general to transmitting a document from a scanner to an e-mail server and, more particularly, to recovering from an error occurring before receipt of the scanned document by the e-mail server.

BACKGROUND OF THE INVENTION

A useful feature provided on some scanners enables a user to electronically send a scanned document to designated recipients. The user designates the recipients and scans the document. The scanner establishes communication over a network with an electronic mail (e-mail) server and transmits the document to the e-mail server. The e-mail server either delivers the document to the recipients or routes the document to one or more other servers for ultimate delivery to the recipients.

Conventionally, the user cannot be sure that the document has been properly delivered to the e-mail server from the scanner. Under certain circumstances, the document may be lost while it appears to the user that the document has been successfully transmitted to the e-mail server. For example, if the scanner losses electrical power before the document has been completely transmitted to the e-mail server, the document will be lost. If the user does not notice the power loss, the user may be unaware of the loss of the document.

In another example, if communication between the e-mail server and the scanner is interrupted during transmission of the document to the e-mail server, the document will be lost. The communication may be interrupted by an error in the network or the e-mail server. In this example, the user will have no way of knowing of the loss of the document other than verifying receipt of the document by the recipients.

SUMMARY OF THE INVENTION

According to principles of the present invention, a document is scanned in a scanning device to obtain electronic data. The electronic data represents information on the document. The electronic data is stored to a storage device. An error then occurs either before or after beginning transmission of the data to an e-mail server. The error causes a failure in the communication of the data to the e-mail server. The method of failure detection depends on the type of failure. For a loss of power, the data storage device is examined for the electronic data. If electronic data is found, communication is established with the e-mail server and the electronic data is transmitted to the e-mail server. The data storage device must be a non-volatile data storage device to recover from a loss of power error. For a loss of communication with the server or failure to establish communication with the server, communication is established with the e-mail server and the electronic data is transmitted to the e-mail server.

According to further principles of the present invention, if the failure interrupts a transmission of data, once communication is reestablished with the e-mail server, alternatively either the transfer of data resumes or the transfer of data restarts at the beginning.

Other objects, advantages, and capabilities of the present invention will become more apparent as the description proceeds.

DETAILED DESCRIPTION OF THE INVENTION

Figure 1:
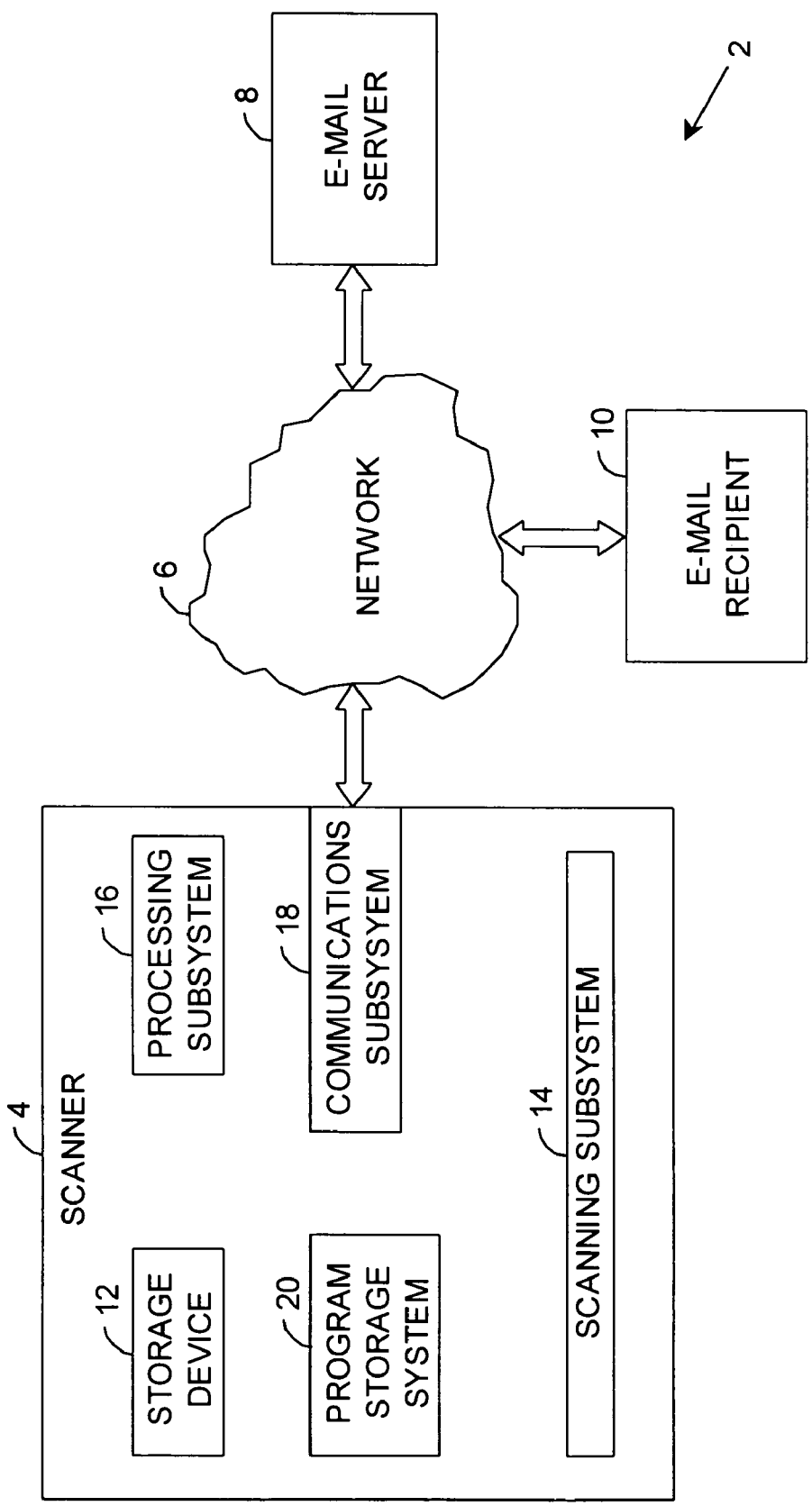
FIG. 1 is a block diagram of a system for practicing the present invention.

The process of the present invention will be best understood by first illustrating the system upon which the present invention may be implemented. FIG. 1 illustrates one such system 2 upon which the present invention may be practiced. System 2 includes a scanner 4, a network 6, an electronic mail (e-mail) server 8, and one or more e-mail recipients 10. For clarity, only one e-mail recipient is represented. Although there may be any number of recipients and the number of recipients is not significant to the present invention.

Scanner 4 is any specific or general purpose computer having a storage device 12 for storing electronic data, a scanning subsystem 14 for scanning a document, a processing subsystem 16 for processing electronic data, and a communication subsystem 18 for communicating electronic data with other systems and devices.

In addition, scanner 4 may include a program storage system 20 readable by a computer, tangibly embodying a program, applet, or instructions executable by the computer to perform method steps. Storage device 12 may be separate portions of scanner 4 or combined as one element of scanner 4.

Scanner 4 may also include other features and capabilities not necessary to the present invention. It is possible that the importance of such other features or capabilities may overshadow the scanning and transmission of data capabilities of the scanner 4. The present invention encompasses all such devices regardless of whether they are referred to as scanners or by some other name.

Storage device 12 may either be a volatile or non-volatile storage device. However, in the event of a recovery from a power loss to scanner 4, storage device 12 must either be a non-volatile storage device or include a means for retaining the electronic data despite a power loss to scanner 4.

Network 6 is any type of network for communicating electronic data. Examples of network 6 include an intranet, a local area network, a wide area network, and the Internet.

E-mail server 8 is any type of e-mail server. An e-mail server is a software application running on a computing device. E-mail server 8 receives electronic data from scanner 4 and routes the electronic data to recipient 10 designated by the originator. E-mail server 8 may either deliver the electronic data directly to recipient 10 or to intervening servers that deliver the electronic data to recipient 10.

E-mail recipient 10 is any device or system that may receive electronic data from an e-mail server 8. Examples of e-mail recipient 10 are e-mail addresses and facsimile machines.

Figure 2:
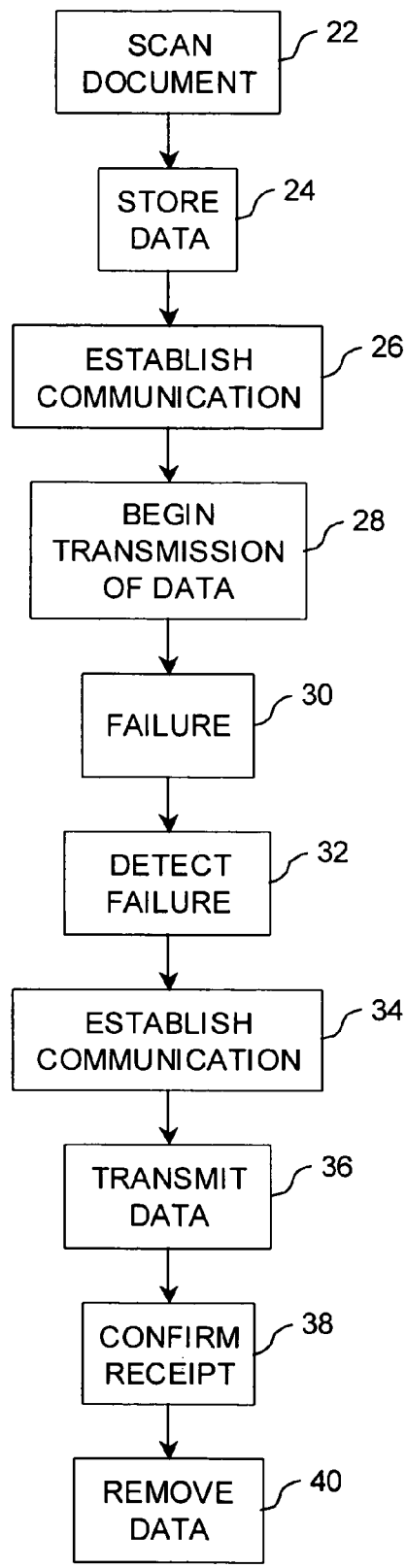
FIG. 2 is a flow chart illustrating the process of the present invention.

FIG. 2 illustrates the process of the present invention. Although FIG. 2 illustrates the process of the present invention as separate discrete steps in a specific order, the present invention encompasses the steps performed in a variety of orders.

A document is scanned 22 to obtain electronic data representative of the document. The electronic data is then stored 24 to storage device 12. In one embodiment, each page of the document is stored 24 as a separate electronic file on storage device 12. In an alternate embodiment, the entire document is stored 24 as one electronic file.

In one embodiment, scanner 4 establishes 26 communication with e-mail server 8 and begins transmitting 28 the electronic data to e-mail server 8 when a failure occurs 30 preventing the completion of the transmission of the electronic data to e-mail server 8. In another embodiment, the failure occurs 30 before communication is established 26 with e-mail server 8. In still another embodiment, the failure occurs 30 after communication is established 26 with e-mail server 8 and before scanner 4 begins transmitting 28 the electronic data to e-mail server 8. In each embodiment, the failure prevents a successful transmission of the electronic data to e-mail server 8.

The failure may be a loss of power to scanner 4 or a communication failure with e-mail server 8. A communication failure with e-mail server 8 may have any cause so long as the result is an inability of scanner 4 to communicate with e-mail server 8.

Scanner 4 then detects 32 the failure. In the case of a power loss to scanner 4, detection 32 of the failure occurs by searching for the electronic data on storage device 12 upon return of power to scanner 4. In order for the data to remain on storage device 12, storage device 12 must either be a non-volatile storage device or include some means for retaining electronic data in the event of a loss of power to scanner 4. If the electronic data is present on storage device 12, scanner 4 attempts to establish 34 communication with e-mail server 8.

In the case of a communication failure with e-mail server 8, detection of the failure occurs by monitoring the status of the communication with e-mail server 8. If scanner 4 is disconnected or fails to establish communication with e-mail server 8, a communication failure is detected. In one embodiment, scanner 4 repeatedly attempts to establish 34 communication with e-mail server 8 until communication is established 34.

Once communication is established 34 with e-mail server 8, scanner 4 transmits 36 the electronic data to e-mail server 8. In one embodiment, if scanner 4 has already transmitted some electronic data to e-mail server 8, scanner 4 resumes transmission of electronic data to e-mail server 8. In another embodiment, scanner 4 restarts transmission of the electronic data at the beginning.

In one embodiment e-mail server 8 confirms 38 receipt of the electronic data. Although, confirmation 38 by e-mail server 8 of the electronic data is not necessary to the present invention, it is desirable for indicating a successful transmission of data.

In one embodiment, once the electronic data has been completely transmitted to e-mail server 8, either with or without confirmation 38, scanner 4 removes 40 the electronic data from storage device 12.

It should be understood that the foregoing description is only illustrative of the invention. Various alternatives and modifications can be devised by those skilled in the art without departing from the invention. Accordingly, the present invention is intended to embrace all such alternatives, modifications, and variances that fall within the scope of the appended claims.

What is claimed is:

1. In a system for electronically transmitting to an electronic mail (e-mail) server electronic data derived from optically scanning a document, a method for recovering from an interruption in electrical power causing a failure in the complete transmission of the electronic data to the e-mail server, the method comprising:

storing the electronic data to a non-volatile storage device;

transmitting the electronic data to the e-mail server;

removing the electronic data from the storage device after the electronic data has been completely transmitted to the e-mail server;

determining if the electronic data is present on the storage device after the interruption in electrical power; and if the electronic data is determined to be present on the storage device after the interruption in electrical power, resuming the transmission of the electronic data to the e-mail server or restarting the transmission of the electronic data to the e-mail server.

2. The method of claim 1 further including confirming receipt of all of the electronic data by the e-mail server.

3. A system for recovering from an interruption in electrical power causing a failure in the complete transmission of electronic data to an e-mail server, the system comprising:

scanning hardware for optically scanning a document to create electronic data;

a non-volatile storage device for storing the electronic data;

means for transmitting the electronic data to the e-mail server;

means for removing the electronic data from the storage device after the electronic data has been completely transmitted to the e-mail server;

means for determining if the electronic data is present on the storage device after the interruption in electrical power; and means for, if the electronic data is determined to be present on the storage device after the interruption in electrical power, resuming the transmission of the electronic data to the e-mail server or restarting the transmission of the electronic data to the e-mail server.

4. The system of claim 3 further including means for confirming receipt of all of the electronic data by the e-mail server.

5. A program storage system readable by a computer, tangibly embodying a program, applet, or instructions executable by the computer to perform method steps for recovering from an interruption in electrical power causing a failure in a complete transmission of electronic data to an e-mail server, the electronic data derived from optically scanning a document, the method steps comprising:

storing the electronic data to a non-volatile storage device;

transmitting the electronic data to the e-mail server;

removing the electronic data from the storage device after the electronic data has been completely transmitted to the e-mail server;

determining if the electronic data is present on the storage device after the interruption in electrical power; and if the electronic data is determined to be present on the storage device after the interruption in electrical power, resuming the transmission of the electronic data to the e-mail server or restarting the transmission of the electronic data to the e-mail server.

6. The program storage system of claim 5 further including the method step, confirming receipt of all of the electronic data by the e-mail server.

* * * * *